(12) United States Patent
Flett et al.

(10) Patent No.: US 11,792,198 B2
(45) Date of Patent: Oct. 17, 2023

(54) SELF-SERVICE TERMINAL SECURE BOOT DEVICE ORDER MODIFICATION

(71) Applicant: NCR Corporation, Duluth, GA (US)

(72) Inventors: Graham Flett, Dundee (GB); Tomasz Kruczek, Dundee (GB); Anthony Edward Roper, Dundee (GB)

(73) Assignee: NCR Corporation, Atlanta, GA (US)

( * ) Notice: Subject to any disclaimer, the term of this patent is extended or adjusted under 35 U.S.C. 154(b) by 627 days.

(21) Appl. No.: 14/699,001

(22) Filed: Apr. 29, 2015

(65) Prior Publication Data

US 2016/0323276 A1 Nov. 3, 2016

(51) Int. Cl.
*H04L 9/40* (2022.01)
*G06Q 20/10* (2012.01)
*H04W 12/06* (2021.01)
*G06Q 20/18* (2012.01)
*H04W 12/63* (2021.01)

(52) U.S. Cl.
CPC ....... *H04L 63/102* (2013.01); *G06Q 20/1085* (2013.01); *G06Q 20/18* (2013.01); *H04L 63/083* (2013.01); *H04W 12/06* (2013.01); *H04W 12/63* (2021.01)

(58) Field of Classification Search
CPC ....... H04L 63/10; H04L 63/08; H04L 63/102; H04L 63/0876; H04W 12/06
USPC .............................................................. 726/4
See application file for complete search history.

(56) References Cited

U.S. PATENT DOCUMENTS

| | | | | |
|---|---|---|---|---|
| 2002/0083362 | A1* | 6/2002 | Semo | G06F 9/4416 714/4.11 |
| 2004/0243997 | A1* | 12/2004 | Mullen | G06F 8/60 717/174 |
| 2005/0289218 | A1* | 12/2005 | Rothman | G06F 3/0605 709/203 |
| 2007/0245142 | A1* | 10/2007 | Rios | G06F 21/572 713/168 |
| 2009/0125709 | A1* | 5/2009 | Martinez | G06F 9/4416 713/2 |
| 2014/0282815 | A1* | 9/2014 | Cockrell | H04L 63/20 726/1 |
| 2016/0378602 | A1* | 12/2016 | Herzi | G06F 11/1417 714/2 |

* cited by examiner

*Primary Examiner* — William S Powers
(74) *Attorney, Agent, or Firm* — Schwegman Lundberg & Woessner, P.A.

(57) ABSTRACT

Various embodiments herein each include at least one of systems, methods, and software for SST secure boot device order modification. One such embodiment, in the form of a method performed by a server, includes, receiving a request from a mobile device app to modify a boot order of a computer controlling operation of an SST. The method proceeds by authenticating the request. When the request is authenticated, the server performing the method then sends a command to the SST to modify the boot order of the SST.

13 Claims, 4 Drawing Sheets

SELF-SERVICE TERMINAL SECURE BOOT DEVICE ORDER MODIFICATION

BACKGROUND INFORMATION

Self-Service Terminals (SSTs), such as Automated Teller Machines (ATMs), include significant security measures to protect currency stored therein and transaction services performed thereon. One such security measure is password protecting the BIOS of a computer controlling the SST, in particular to protect the boot device order. The reasoning is that if an SST were to boot from a removable media, such as an optical disc or a memory stick, software stored thereon could be executed to cause the SST to dispense currency, to load malicious code, or otherwise modify operation of the SST for malicious purposes. However, such security measures that password protect the BIOS and boot device order presents challenges to SST technicians when servicing the SST. The SST technician must know the password or possess other security credentials for the specific SST to perform needed servicing, which may include booting the SST in a diagnostic mode from a removable media. Administering these credentials is challenging and maintaining their security is required. At the same time, a technician in possession of the credentials may use the credentials at any time, even for malicious purposes. Thus, while password and other security credentials may provide added security, such solutions provide additional challenges.

SUMMARY

Various embodiments herein each include at least one of systems, methods, and software for SST secure boot device order modification. One such embodiment, in the form of a method performed by a server, includes, receiving a request from a mobile device app to modify a boot order of a computer controlling operation of an SST. The method proceeds by authenticating the request. When the request is authenticated, the server performing the method then sends a command to the SST to modify the boot order of the SST.

Another method embodiment includes a method performed by a process that executes on a server. The method of such embodiments includes receiving a request from a mobile device app to modify operation of a computer controlling operation of an SST. The request of such embodiments includes data identifying the SST, data identifying at least one SST operation modification, identity data of a requestor, and location identifying data of a location of the requestor. This method then verifies the requestor is authorized to make the requested modification to operation of the specific SST and that the requestor is located proximate to the SST. When the requestor is authorized to make the requested modification to operation of the specific SST and is located proximate to the SST, the method of such embodiments proceeds by sending a command to the SST to modify the boot order of the SST.

A further embodiment is in the form of a system. The system of this embodiment includes at least one processor, at least one memory, and an instruction set accessible in the memory and executable by the at least one processor to perform data processing activities. The data processing activities may include receiving a request from a mobile device app to modify operation of a computer controlling operation of an SST. Such a request may include data identifying the SST, data identifying at least one SST operation modification, identity data of a requestor, and location identifying data of a location of the requestor. The data processing activities also include verifying the requestor is authorized to make the requested modification to operation of the specific SST and that the requestor is located proximate to the SST. When the requestor is authorized to make the requested modification to operation of the specific SST and is located proximate to the SST, the data processing activities continue execution by sending a command to the SST to modify the boot order of the SST.

DETAILED DESCRIPTION

Figure 1:
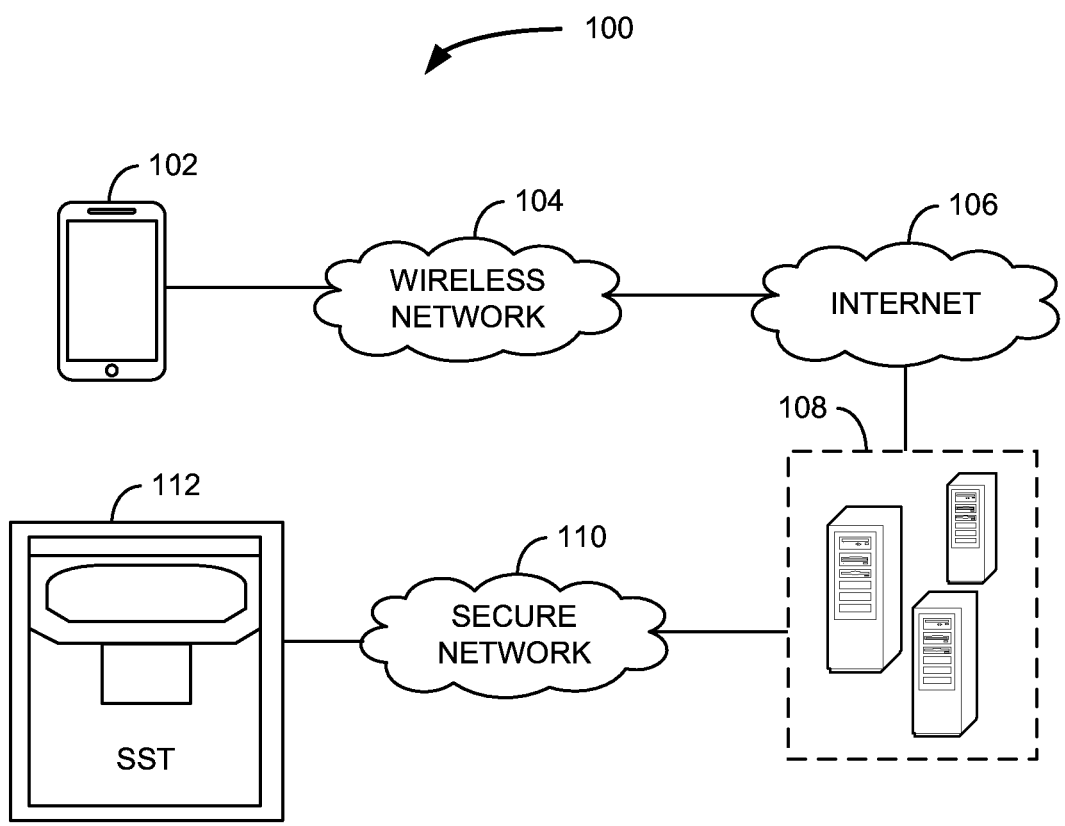
FIG. 1 is a logical block diagram of a system, according to an example embodiment.

Various embodiments herein each include at least one of systems, methods, and software for SST secure boot device order modification. Such embodiments enable an SST technician to modify the boot device order of an SST to be serviced, such as to allow the technician to boot a computer controlling the SST from a removable computer readable media rather than a main disk of the computer. Some such embodiments include a mobile device app or application that executes on, or is accessible from, another mobile computing device type, such as a laptop computer. In some embodiments, the SST technician selects an SST to be serviced within a mobile device app and submits a request to modify the boot device order of the SST. The request is submitted by the mobile device app over a data communication network to a server that processes such requests and sends at least one command to the SST via either the same network or via another network, such as a secure network. The server, in some embodiments, executes the e-Policy Orchestrator (ePO) with DeepCommand installed, both available from McAfee, Inc. of Santa Clara, Calif. Regardless of the source of the server software, the server processes, in sending the at least one command to the SST, leverages functionality of out-of-band management, and in particular an out-of-band controller of the SST. In some embodiments, the out-of-band controller of the SST is an out-of-band controller including the Intel Active Management Technology (AMT) from Intel Corporation of Santa Clara, Calif.

As modification of the boot device order of an SST, such as an ATM, can place the SST at risk, embodiments include security measures. Some such security measures include secured access to the mobile device app such that the technician must login to the mobile device app. Further, when a request to modify the boot device order is sent to the server, the request may include security credential data, such as a user identifier and password, as well as other information, such as current location information of the mobile device (i.e., Global Positioning System, or GPS, coordinates). The user identifier and password may be validated and the current location information may be compared to a location of the SST that is the subject of the request. When the current location information is not proximate to the SST, the request may be denied. Other embodiments may include further security validations, such as verifying a known technician is authorized with regard to the specific SST, is authorized at the present time, and the like.

The request to modify the boot device order of the SST may further include, based on input received within the mobile device app, a number of times the boot device order modification is to be followed (i.e., five reboots) or an effective period for the boot device order modification (i.e., 30 minutes). In other embodiments, the server processes may automatically set this or the SST may have an automatic time out period or a number of allowed boots with the modification before it automatically turns back to the normal boot device order.

These and other embodiments are described herein with regard to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 includes a mobile device 102, a wireless network 104, the Internet 106, servers 108, a secure network 110, and an SST 112. The mobile device 102 may be a smartphone, a tablet, a smartwatch, a smart-controller within an automobile, a handheld computing device, a personal computer such as a laptop, or other computing device. The mobile device 102 connects wirelessly to the wireless network 104 and the Internet 106. The wireless network 104 is intended to reflect a first network path the mobile device 102 connects to in order to connect to another network, such as the Internet 106, to which the servers 108 are connected. Thus, the wireless network 104 may be a wireless data network operated by a wireless service provider. However, the wireless network 104 may instead be a Wi-Fi network, such as may be accessed via a Wi-Fi hotspot provided by the SST 112, within a facility where the SST is located 112, or otherwise.

The servers 108 are connected to a network, such as the Internet 106, that allows processes that execute on the servers 108 to communicate with mobile devices 102. The servers 108 are also connected to a secure network 110, such as a secure network 110 dedicated at least in part to communicating with SSTs 112, such as an ATM network. The secure network 110 may rely on secure networking protocols that allow secure data to be carried on other networks, such as the Internet 106. However, in some embodiments, the secure network 110 may be, at least in part, a physically secured network.

The SST 112 is a terminal through which customers can interact and conduct transactions. In some embodiments, the SST 112 may be a self-service checkout terminal. In other embodiments, the SST 112 may be an ATM. In further embodiments, the SST 112 may be a gaming machine or other machine on which one or both of secure customer interactions and transaction may be conducted.

The mobile device 102 typically includes an app, or is otherwise able to access software (e.g., a web browser accessible software system), that authenticates users and provides functionality pertinent to an SST 112 technician. This may include scheduling and communication functionality, but need not. Regardless, the mobile device 102 app includes functionality that allows the SST 112 technician to request a modification to a boot device order of the SST 112. Modification of the boot device order allows the technician to change the boot device from booting from a main disk (i.e., a C:\ drive) to another device, such as an optical disc drive or a memory stick device. By booting from another device, the SST 112 may be loaded with other software for various maintenance and diagnostic purposes.

The mobile device 102 app generally provides an interface through which a technician can generate a request to modify the boot order of a specific SST. The technician specifies a target SST such as by selecting an SST from a list, a map presenting SST proximate to the mobile device 102 based on GPS or other localization data, by scanning, with a camera of the mobile device 102, a barcode affixed to or displayed by the SST, or otherwise. Once the target SST 112 is identified, the technician may then specify what action to perform, such as simply rebooting the SST 112, turn off the SST 112, modify the boot device order of the SST 112, or other action. The request may then be generated by the mobile device 112 app and transmitted to the servers 108, via the wireless network 104 and the Internet 108. The request may include an identifier of the target SST 112 and an identifier of the command to be issued by the servers 108 to modify the boot device order of the target SST 112. In some embodiments, the request may include additional data. For example, GPS or other localization of the mobile device 102, user identifier and password data, certificate or encryption data, and the like may be included in the request. The request, once generated, is transmitted to the servers 108.

The servers 108, upon receipt of the request, process the request. Note that although the servers 108 are illustrated as a plurality of servers 108, some embodiments may include only a single physical server computer. Processes on the servers 108 perform the processing of the request. The processes, as mentioned above, may include the e-Policy Orchestrator (ePO) software with DeepCommand installed, both available from McAfee, Inc. of Santa Clara, Calif. The processes generally authenticate the request, such as with regard to one or more of the requesting user, any credential or security data included in the request, the content of the request, the target SST 112 of the request, and any authentication rules that may be applicable to such requests. The authentication rules may include one or more of verifying the mobile device is located proximate to the target SST 112 to ensure the proper target SST 112 was identified in the request, verifying the technician is authorized with regard to the target SST 112, that the request is received within an allowed period, among other possible rules in various embodiments.

If the request is not authenticated, an error message may be returned by the processes on the server 108 to the mobile device 102 app. When the request is authenticated, a message may be sent back to the mobile device 102 indicating so and one or more commands are sent to the target SST 112 to modify the boot device order. The one or more commands sent to the target SST 112 may be commands executable by an out-of-band controller of a computer that controls operation of the target SST, such as an out-of-band controller including the Intel Active Management Technology (AMT) from Intel Corporation of Santa Clara, Calif.

Figure 2:
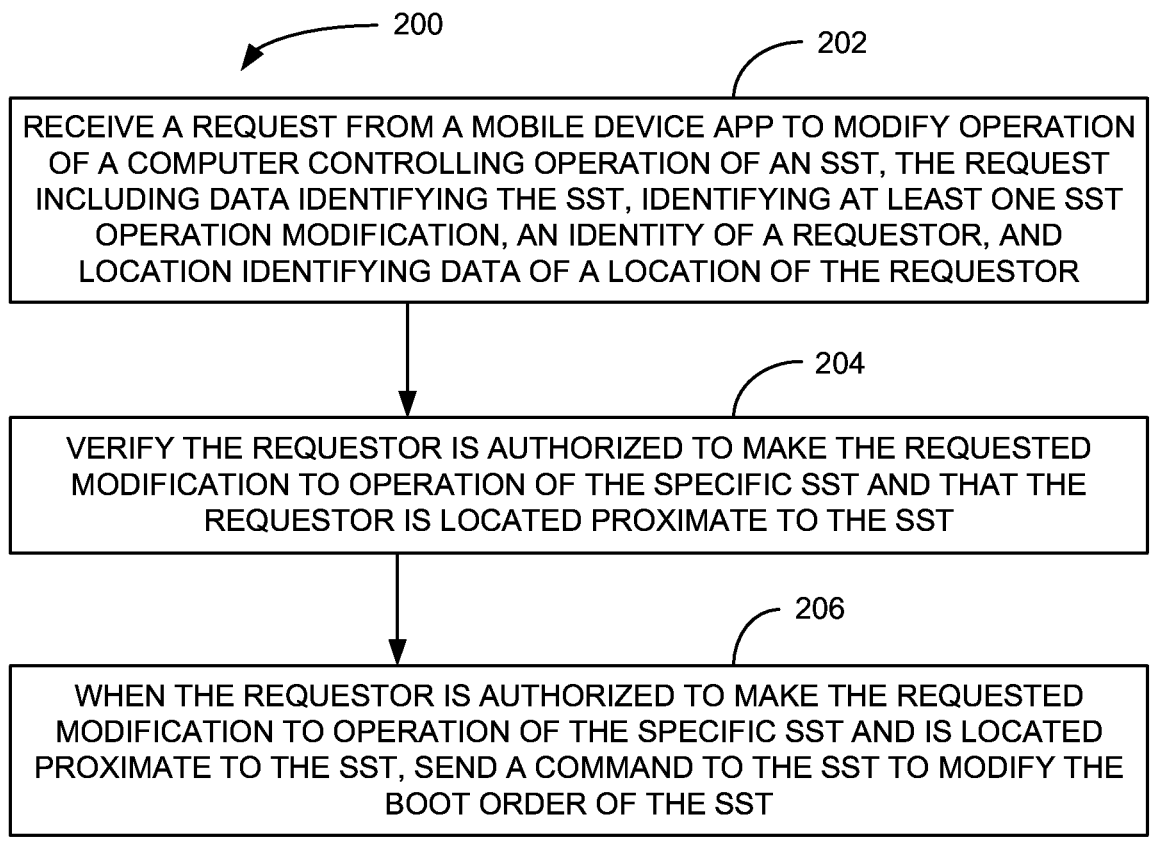
FIG. 2 is a block flow diagram of a method, according to an example, embodiment.

FIG. 2 is a block flow diagram of a method 200, according to an example, embodiment. The method 200 is an example of a method performed by one or more processes that execute on one or more servers, such as the servers 108 of FIG. 1. The method 200 includes receiving 202 a request from a mobile device app to modify operation of a computer controlling operation of an SST. The request may include data identifying the SST, at least one SST operation modification, an identity of a requestor, and location identifying data of a location of the requestor, such as GPS or other localizing data of the mobile device, on which the mobile device app executes, from which the request was received. The method 200 further includes verifying 204 the requestor is authorized to make the requested modification to operation of the specific SST and that the requestor is located proximate to the SST. When the requestor is authorized to make the requested modification to operation of the specific SST and is located proximate to the SST, the method 200 includes sending 206 a command to the SST to modify the boot order of the SST.

In some embodiments of the method 200, the request received 202 to modify operation of the computer controlling operation of the SST is a request to change a boot order of devices from which to boot the computer controlling operation of the SST. In some of these and other embodiments of the method 200, the command includes a measure of applicability for the modified boot order of the command, the measure of applicability includes at least one of a number of boots and a period.

Figure 3:
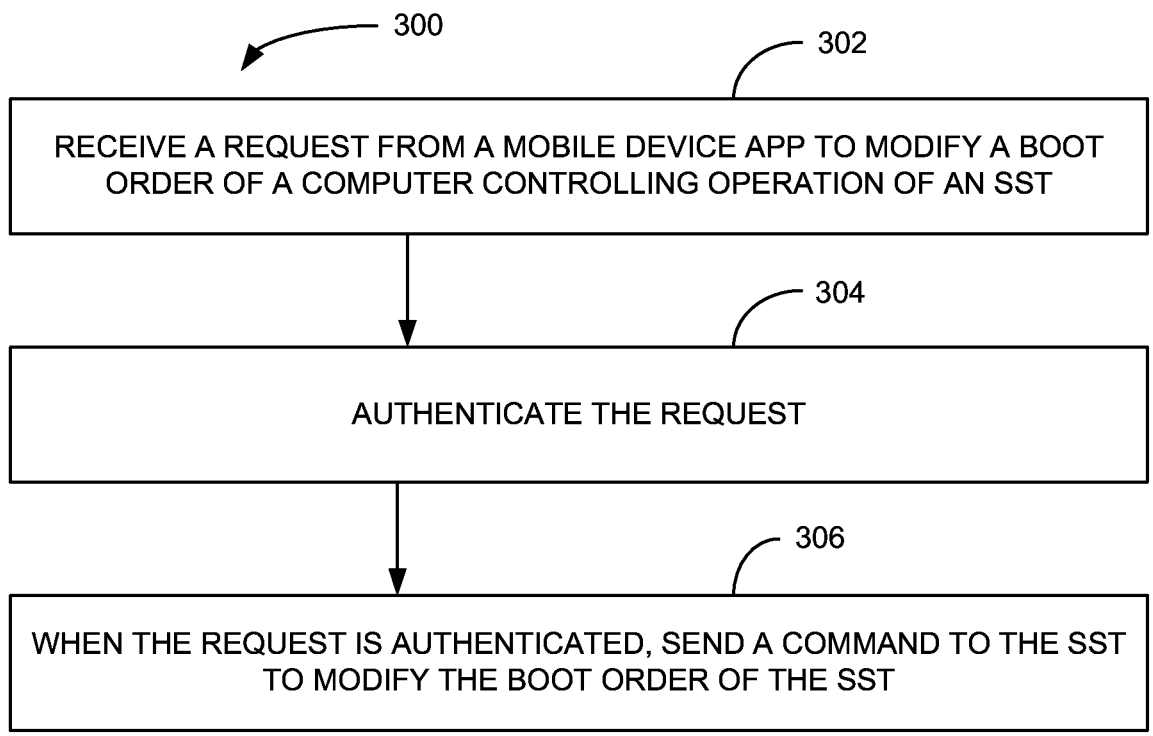
FIG. 3 is a block flow diagram of a method, according to an example, embodiment.

FIG. 3 is a block flow diagram of a method 300, according to an example, embodiment. The method 300 is another example of a method performed by one or more processes that execute on one or more servers, such as the servers 108 of FIG. 1. The method 300 includes receiving 302 a request from a mobile device app to modify a boot order of a computer controlling operation of an SST, such as an ATM. The method 300 then authenticates 304 the request. When the request is authenticated, the method 300 then sends 306 a command to the SST to modify the boot order of the SST. In some such embodiments of the method 300, the request is received 302 on a first network and the command is sent 306 via a second network. In such embodiments, the first network includes at least one unsecured network and the second network is a secured network.

In some embodiments, authenticating 304 the request includes authenticating the user and verifying that the user, when authenticated, is authorized to modify the boot order. In some of these and other embodiments, the boot order of the computer controlling operation of the SST is secured.

In some embodiments, the command sent 306 to the SST instructs an out-of-band controller of the computer controlling operation of the SST to modify the boot order. Further, in some embodiments, the command includes a measure of applicability for the modified boot order of the command, such as one or more of a number of boots and a period for which the modified boot order is applicable.

Figure 4:
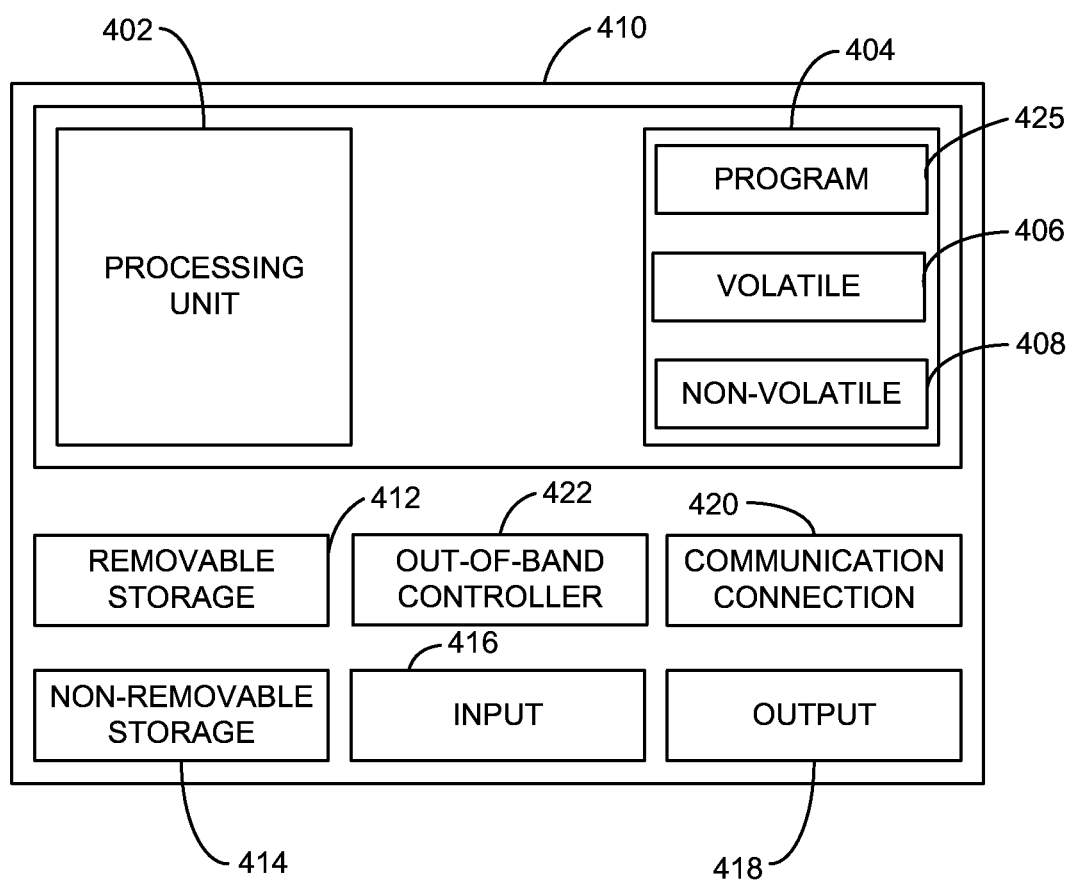
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices. Computer 410 also typically includes an out-of-band controller 422.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, by a server, a request over a first network of a first network type that is at least partially not a secure network from a mobile device app that executes on a handheld mobile device to modify a secured boot order of a computer controlling operation of a Self-Service Terminal (SST);
   authenticating the request on the server, the authenticating including authenticating the user and verifying that the user, when authenticated, is authorized to modify the secured boot order; and
   when the request is authenticated, sending a command from the server over a second network of a second network type that is a secure network to the SST to modify the secured boot order of the SST, the command instructing an out-of-band controller of the computer controlling operation of the SST to modify the secured boot order, wherein the second network is a physically distinct from the first network.

2. The method of claim 1, wherein the SST is an Automated Teller Machine.

3. The method of claim 1, wherein the command includes a measure of applicability for the modified secured boot order of the command.

4. The method of claim 3, wherein the measure of applicability includes at least one of a number of boots and a period.

5. A method comprising:
   receiving, by a server on a first network of a first network type that is not fully secure, a request from a mobile device app that executes on a handheld mobile device to modify secured operation of a computer controlling operation of a Self-Service Terminal (SST), the request including data identifying the SST, identifying at least one SST operation modification of a secured operation, an identity of a requestor, and location identifying data of a location of the requestor;
   verifying on the server that the requestor is authorized to make the requested modification to the secured operation of the specific SST and that the requestor is located proximate to the SST, and
   upon successful verification that the requestor is authorized to make the requested modification to the secured operation of the specific SST and is located proximate to the SST, sending a command from the server on a second network of a second network type that is fully secure to the SST to modify the secured operation of the SST, the command instructing an out-of-band controller of the computer controlling operation of the SST to modify the secured operation, wherein the second network is a physically distinct from the first network.

6. The method of claim 5, wherein the location identifying data includes Global Positioning System (GPS) data.

7. The method of claim 5, wherein the request to modify the secured operation of the computer controlling operation of the SST is a request to change a boot order of devices from which to boot the computer controlling operation of the SST.

8. The method of claim 7, wherein the SST is an Automated Teller Machine (ATM).

9. The method of claim 5, wherein the command includes a measure of applicability for the modified operation command, the measure of applicability includes at least one of a number of boots and a period.

10. A system comprising:
    a handheld mobile device;
    at least one processor;
    at least one memory; and
    an instruction set accessible in the memory and executable by the at least one processor to perform data processing activities, the data processing activities comprising:
    receiving a request by the system on a first network of a first network type that is not fully secure from a mobile device app that executes on a handheld mobile device to modify secured operation of a computer controlling operation of a Self-Service Terminal (SST), the request including data identifying the SST, identifying at least one SST operation modification of a secured operation, an identity of a requestor, and location identifying data of a location of the requestor;
    verifying on the system that the requestor is authorized to make the requested modification to the secured operation of the specific SST and that the requestor is located proximate to the SST; and
    when the requestor is authorized to make the requested modification to the secured operation of the specific SST and is located proximate to the SST, sending a command from the system on a second network of a second network type that is fully secure to an out-of-band controller of the SST instructing the out-of-band controller to modify the secured operation of the SST, wherein the second network is a physically distinct from the first network.

11. The system of claim 10, further comprising:
    at least one network interface device.

12. The system of claim 10, wherein the request to modify the secured operation of the computer controlling operation of the SST is a request to change a boot order of devices from which to boot the computer controlling operation of the SST.

13. The system of claim 10, wherein the SST is an Automated Teller Machine (ATM).

* * * * *